Patented Apr. 6, 1943

2,315,745

UNITED STATES PATENT OFFICE 2,315,745

PREPARATION OF LOWER ALKYL ETHERS OF METHYLOLUREA

Ben Edmund Sorenson, Upper Darby, Pa., assignor to E. I. du Pont de Nemours & Company, Wilmington, Del., a corporation of Delaware No Drawing. Application July 23, 1940, Serial No. 347,039

7 Claims. (Cl. 260—553)

This invention relates to the preparation of urea-formaldehyde derivatives and more particularly to the alkyl ethers of nonresinous urea-formaldehyde condensation products such as dimethylolurea.

Urea and formaldehyde have been condensed to dimethylolurea in the presence of alcohol. In nonaqueous solvents such as ethyl alcohol, owing to the insolubility of the products, coupled with the decreased ionization of the alkalies, the action of strong alkaline condensing agents leads to the formation of mono- or dimethylolurea without subsequent polymerization. It is therefore not novel to condense urea and formaldehyde in the presence of caustic alkalies in alcoholic solution, but hitherto the reaction has never been carried past the dimethylolurea stage. The preparation of alkyl ethers by the condensation of urea and formaldehyde in an alkaline alcoholic medium has hitherto not been attained.

This invention has as an object the provision of a simple low-cost method for preparing ethers of non-resinous methylolurea compounds which were desired for use as creaseproofing agents. Other objects will appear hereinafter.

These objects are accomplished by the following invention wherein a mixture of urea, formaldehyde and a monohydric alcohol of from one to four carbon atoms is allowed to react in the presence of caustic alkali sufficient to bring the hydrogen ion concentration of the reaction mixture to a pH of at least 9 until a product soluble in the alcohol is produced, the reaction being terminated when the products are substantially all dissolved and before the soluble reaction product becomes resinous.

In carrying out the reaction, the caustic alkali catalyst is preferably first dissolved in alcohol followed by addition of the formaldehyde. The urea is next added, and the reaction to form the methylolurea ether allowed to proceed.

The course of the reaction is governed by the quantity of caustic alkali used as catalyst. With large proportions of alkali, the reaction proceeds directly to the formation of the desired methylolurea ether. Where the proportion of alkali is small but of pH at least 9, the methylolurea is first formed and separates from the solution after which etherification and re-solution takes place. When the quantity of alcohol is low, the methylolurea will also sometimes separate but as the etherification proceeds the reaction mixture again becomes a homogeneous solution. The end point of the reaction is very easily determined in the case of those mixtures where the methylolurea crystallizes out and redissolves, for reaction can be considered to be complete when the methylolurea has substantially redissolved. In the case of those reaction mixtures which remain as solutions, the end point is determined by evaporating a few drops of the reaction mixture to dryness, whereupon a mass of crystals of the alkyl ether of the methylolurea will usually be formed. It is desirable to seed the solution with a crystal of the pure ether to accelerate the test. The reaction should be terminated before the solution leaves a resinous mass on evaporation. Where a pure crystalline ether is desired, the product can be isolated from the solution usually by concentration of the solution and chilling or simply by chilling. For many purposes, however, the reaction mixture as such will be suitable for further use, or the only operation necessary may be a concentration step.

It is important to terminate the reaction before resinification of the reaction mixture has taken place. This can in general be accomplished either by neutralization of the alkaline catalyst or by isolation of the reaction product by concentration or crystallization followed by or preceded by neutralization. Where the reaction mixture is to be used immediately resinification may be arrested by cooling, or the reaction product may be utilized at once for the purpose for which it was prepared.

The more detailed practice of the invention is illustrated by the following examples, wherein parts given are by weight. There are of course many forms of the invention other than these specific embodiments.

Example I

This example illustrates the formation of the dimethyl ether of dimethylolurea by the reaction of methanol, formaldehyde, and urea in the presence of sodium hydroxide at room temperature.

Seven parts of sodium hydroxide is dissolved in 500 parts of anhydrous methanol. One hundred ninety-five parts of paraformaldehyde is then introduced and after this material has dissolved, 225 grams of urea is added to the mixture. The solution is allowed to stand for three days at room temperature. At this time it is still a clear solution. A small sample on evaporation deposits a thick mush of crystals of the dimethyl ether of dimethylolurea.

Example II

This example illustrates the preparation of the methyl ether of dimethylolurea from urea, paraformaldehyde, and methanol in the presence of sodium hydroxide catalyst using varying proportions of sodium hydroxide.

A reaction mixture is prepared by dispersing 25 parts of paraformaldehyde in 50 parts of anhydrous methanol faintly alkaline with sodium hydroxide followed by addition of 25 parts of urea. The solution is divided into seven equal parts to each of which various amounts of solid sodium hydroxide are added as follows:

| | Parts |
|---|---|
| Solution A | .1 |
| Solution B | .3 |
| Solution C | .5 |
| Solution D | 1.0 |
| Solution E | 1.5 |
| Solution F | 2.0 |
| Solution G | 3.0 |

The pH of each solution is above 10.

The reaction mixtures are allowed to stand at 25° C. Mixtures F and G remain clear solutions. The remaining mixtures become solid with a white mass of crystals which are apparently dimethylolurea.

*Solution A.*—After 42 days at room temperature, this solution is still substantially solid, but shows signs of liquefaction. After several more weeks a clear solution is formed.

*Solution B.*—This reaction mixture becomes solid after standing about 20 hours and after a total reaction time of 42 days has again completely reliquefied. The solution is cooled whereupon a mass of crystals separated. The weight of crystals is 30 parts. The mother liquor on evaporation deposits a further crop of crystals. The residue from the mother liquor is not resinous.

*Solution C.*—This mixture which deposits a solid mass of dimethylolurea after 20 hours again reliquefies after standing 18 days at room temperature. On chilling 45 parts of the dimethyl ether of dimethylolurea separates out. The mother liquor, on evaporation, leaves a residue non-resinous in character.

*Solution D.*—This mixture which deposits a white mass of dimethylolurea after 20 hours again substantially completely reliquefies in five days. On chilling, 30 parts of the dimethyl ether of dimethylolurea is isolated. The mother liquor on evaporation leaves a syrup non-resinous in character.

*Solution E.*—This solution which deposits a mass of white dimethylolurea crystals after 20 hours has again reliquefied in 3 days. The yield of crystalline dimethyl ether of dimethylolurea isolated by chilling is 32 parts. A non-resinous residue is left upon evaporation of the mother liquor.

*Solution F.*—This mixture does not deposit dimethylolurea. After 3 days at room temperature the solution is cooled, whereupon 37 parts of the dimethyl ether of dimethylolurea separates out. The mother liquor upon evaporation leaves a syrup which is a very effective creaseproofing agent for cotton broadcloth.

*Solution G.*—This mixture does not deposit dimethylolurea. After standing 3 days the dimethyl ether of dimethylolurea separates on chilling. The yield is 25 parts. The residue left by evaporation of the mother liquor is a non-resinous syrup.

*Example III*

This example illustrates the preparation of the methyl ether of dimethylolurea at room temperature from methanol, formalin, urea, and sodium hydroxide, using from 0.65 to 2.6% sodium hydroxide based on the reaction mixture as catalyst.

To one part of solid sodium hydroxide, dissolved in 60 parts of methanol, is added sixty parts of formalin, the solution is cooled to room temperature, and 25 parts of urea is dissolved in the mixture. The solution has a pH of 11.00. After standing three days at room temperature, the solution on evaporation to dryness deposits a mass of needles of the dimethyl ether of dimethylolurea. A solution of the reaction mixture in water acidified to a pH of 4 is stable without precipitation for a period five times as long as a solution of dimethylolurea of the same concentration. It is an excellent creaseproofing agent for cotton broadcloth. Similar preparations made using 2, 3, and 4 parts of solid sodium hydroxide have essentially the same properties. The pH's of the solutions to which 2 and 3 parts of sodium hydroxide are added are approximately 11.

A series of reaction mixtures prepared similar to those described in Example III using 0.1, 0.3, and 0.5 part of sodium hydroxide, respectively, and 50 parts of methanol, and of pH 10.91, 10.95, and 11.03, respectively, are allowed to stand at room temperature. In each instance, a moderate quantity of white crystalline material, probably dimethylolurea crystallizes out on the walls of the reaction vessel. This slowly redissolves, the reaction mixture containing the highest proportion of sodium hydroxide becoming clear in four days. The other reaction mixtures require somewhat longer. After the solutions have become clear they are neutralized with dilute acetic acid to prevent resinification.

When 17% less methanol is used in the reaction mixture of the above example, i. e., when the compositions are duplicated except that 50 parts of methanol is used instead of 60 parts, no essential difference can be observed between the properties of the two series of reaction mixtures.

*Example IV*

This example illustrates the preparation of the methyl ether of a methylolurea condensation product in the presence of small amounts of methanol.

To forty parts of a 10% solution of sodium hydroxide in methanol, diluted with 60 parts of methanol is added sixty-seven parts of 37% formaldehyde, and the mixture cooled. Twenty-five parts of urea is dissolved in the mixture. The solution is allowed to stand at room temperature. In about 20 hours, the reaction mixture has changed to a mass of white crystals, apparently of dimethylolurea, and a small amount of supernatant liquor. After standing 10 days at room temperature, the reaction mixture has changed to a thin slurry. Two weeks later, the mixture has formed a clear solution. The solution, on dilution with water and acidification, is stable toward precipitation for several days, whereas a solution of dimethylolurea at the same hydrogen ion concentration becomes cloudy within 5 hours.

When the methanol in the above example is replaced by an equal weight of water, the reaction mixture becomes solid after standing less than 20 hours and shows no sign of reliquefaction even after standing at room temperature for three months.

When twice the quantity of methanol is used, there is no evidence of dimethylolurea formation, as evidenced by material crystallizing out in the reaction mixture, over a period of 3 weeks. At the end of one week a heavy crop of crystals of the dimethyl ether of dimethylolurea can be isolated by evaporating the reaction mixture to dryness.

Example V

This example illustrates the preparation of the methyl ether of a methylolurea by reaction in the presence of small quantities of methanol using a high ratio of sodium hydroxide to methanol.

To eight parts of sodium hydroxide, dissolved in 92 parts of methanol is added two hundred sixty-eight parts of 37% formaldehyde and the mixture cooled. One hundred parts of urea is next dissolved in the solution. After standing for 24 hours at room temperature, the reaction mixture which has a pH over 10 takes the form of a soft fluid mush. After 10 days the mixture is a very thin paste, and two weeks later it has become a clear solution. The properties of the solution are essentially those of the solution of Example IV.

Example VI

This example illustrates the preparation of a urea-formaldehyde condensation product methyl ether using low proportions of both formaldehyde and methanol in the presence of moderate proportions of sodium hydroxide.

Four parts of sodium hydroxide is dissolved in 96 parts of methanol, after which 75 parts of formaldehyde in the form of a 37% solution was added. The solution becomes warm and is cooled back to room temperature. One hundred parts of urea is then dissolved in the mixture. No separation of the reaction mixture takes place even after standing for three weeks at room temperature. The properties of the solution are essentially those of the product of Example IV.

When, in the process above, instead of methanol, an equal weight of water is used, the reaction mixture sets to a solid mass within 24 hours and shows no tendency to reliquefy, even after standing for three months at room temperature.

Example VII

This example illustrates the preparation of the isobutyl ether of dimethylolurea by condensation of dimethylolurea with isobutanol in the presence of sodium hydroxide and also illustrates reaction at a higher temperature.

A mixture of 40 parts of dry dimethylolurea, 200 parts of isobutanol, and 1 part of sodium hydroxide is heated at a maximum temperature of 75° C. with stirring until the dimethylolurea dissolves. The liquid is filtered, the filtrate evaporated to the point of crystallization, and the crystals washed twice with hot water. The water-washed crystals recrystallized twice from ethyl ether have a melting point of 80–83° C. and a nitrogen content of 12.4%. The melting point of diisobutyl ether of dimethylolurea is 82° C. and the calculated nitrogen content, 12.1%.

Example VIII

This example illustrates the preparation of the methyl ether of dimethylolurea at elevated temperatures and also illustrates the method of determining the end point in the preparation of these ethers.

Ten parts of sodium hydroxide is dissolved in 190 parts of methanol, after which 335 parts of formalin is added and 125 parts of urea. The mixture is heated to refluxing. After a refluxing time of 60 minutes, a small sample is withdrawn and evaporated. A sticky syrup containing a moderate proportion of crystals of the dimethyl ether of dimethylolurea is obtained. After heating 20 more minutes, the reaction mixture upon evaporation leaves a syrupy mass containing still more crystals. After 100 minutes, the reaction mixture leaves a stiff resinous mass containing only a few crystals, and after 120 minutes the residue upon evaporation is a stiff sticky resin. The optimum reaction time for a reaction mixture of this composition is between 80 and 100 minutes.

Example IX

This example illustrates the preparation of the methyl ether of dimethylolurea by refluxing urea, paraformaldehyde, and methanol together in the presence of sodium hydroxide.

Fifteen parts of sodium hydroxide is dissolved in 285 parts of methanol, after which 150 parts of paraformaldehyde is dispersed in the methanol. One hundred fifty parts of urea is then dissolved in the mixture. The solution obtained is heated to boiling. After 20 minutes a sample of the reaction mixture upon evaporation to dryness deposits a mass of moist sticky crystals. After 40 minutes a stiff, sticky crystalline mass is obtained upon evaporation of the reaction mixture. After 60 minutes a viscous, resinous mass containing only a few crystals is deposited, while after 80 and 100 minutes the residue remaining upon evaporation is a viscous resin depositing practically no crystals on standing. The proper reaction time for a reaction mixture of this composition is between 40 and 60 minutes.

In carrying out the reaction, there may be used any of the types of formaldehyde which have been employed for the preparation of dimethylolurea. This includes aqueous formaldehyde, gaseous formaldehyde, and paraformaldehyde. The ratio of formaldehyde to urea can be chosen within wide limits, since the invention is intended to include ethers of non-resinous urea-formaldehyde condensation products in general. However, for most purposes, particularly where the reaction product is to be used for crease-proofing, a ratio of formaldehyde to urea of from about .9 to 2.5 will usually be desirable. In general, reaction mixtures of best solubility are obtained with proportions of formaldehyde to urea of less than 2:1. This is particularly true when the quantity of alcohol employed in the reaction is of the order of the weight of urea employed.

Although the preferred mode of reaction employs urea, other urea derivatives may be used, such as the symmetrical or unsymmetrical nitrogen-substituted ureas capable of forming methylol compounds. For example, there may be employed unsymmetrical N-methylurea or symmetrical N,N'-dimethylurea. Ureas containing alkyl groups of higher carbon content as well as their alkyl and acyl derivatives also function satisfactorily in the reaction, provided they form methylol compounds.

Products of interest are obtained with as little as one-half mole of formaldehyde per mole of urea or as high as 5 moles of formaldehyde per mole of urea compound. Neither an excess nor a deficiency of formaldehyde causes harm, so long as methylolurea groups are available for etherification. As an alternative, the urea derivative and the formaldehyde may be first condensed and then added to the alcohol in which the required quantity of caustic alkali for promotion of the reaction has been dissolved. Such a process is considerably less desirable however, in view of the extra step involved. The handling of solid urea-formaldehyde product as well as the equipment required for its solution or thorough mixing with the methanol also makes this modification less desirable.

As alcohols there may be used any of the monohydric alcohols having up to four carbon atoms, including methyl, ethyl, propyl, isopropyl, butyl, isobutyl, tertiary butyl, and secondary butyl alcohols. However, the reaction is far more satisfactory when the alcohol employed is methanol or ethanol. The reaction is most satisfactory of all when the alcohol is methanol, and the use of this alcohol represents a preferred embodiment of the invention. In general, the quantity of alcohol employed in forming the reaction mixture should be at least enough to give a finished reaction product which is in the form of a solution. This will usually require at least two moles of alcohol for each mole of urea derivative used in the reaction. The larger the proportion of alcohol used, the more soluble is the finished reaction product and the better the yield. Where formalin is used as one of the reactants, it is preferable to use a larger amount of alcohol in order to bring the methylation reaction more nearly to completion, since the water introduced by the formalin tends to retard complete etherification. For many purposes, complete etherification is not required and in those instances it is not necessary to use such a large amount of alcohol. For example, the monomethyl ether of dimethylolurea requires the use of a lower proportion of alcohol than the preparation of the dimethyl ether of dimethylolurea in high yield.

As catalysts for the reaction there may be used any of the caustic alkalies. This includes sodium hydroxide, potassium hydroxide, lithium hydroxide, caesium hydroxide, and the quaternary ammonium bases. Sodium hydroxide is the preferred catalyst because it is readily available and cheap and is, as far as has been determined, as effective as any of the other types of alkali. The quantity of alkali required varies over wide limits. It is possible to effect reaction with very low quantities of alkali if long reaction times are permissible. Thus, a quantity of alkali sufficient only to give the reaction mixture a pH of 9 will give an effective methyl ether of the desired urea-formaldehyde condensation product only after several weeks reaction at room temperature, whereas a concentration of sodium hydroxide of 5% will give a satisfactory product at room temperature within 40 hours. In general, however, very low proportions of alkali, as well as high concentrations of alkali, are to be avoided, since undesirable by-product reactions can take place in either case. The preferred range of alkali concentration is from 0.2% to 5%, calculated as sodium hydroxide and based on the reaction mixture, whereas the broader range over which the reaction is operable may be taken from that concentration of alkali required to give a pH of about 9 up to a concentration of alkali of 10%.

Since urea derivatives are slowly saponified by the caustic alkali and the tendency toward resinification is also increased as the concentration of alkali is increased, it is usually desirable to use a caustic alkali concentration of 0.3% to 1%. Where the reaction mixture is to be used for crease-proofing, it is often desirable to mix together the required quantities of reagent with the catalyst and to allow reaction to take place directly in the shipping drum or storage container. Where storage is to be extended over any length of time, it is particularly desirable to use a low proportion of alkali provided it is sufficient to give a pH of at least 9. The alkali can be neutralized, of course, after the reaction is complete, and this action is desirable in many cases to prevent resinification. A convenient method of destroying the alkali involves the introduction of a small amount of an ester, such as ethyl acetate, into the reaction mixture. This slowly neutralizes the alkali by saponification on standing.

It is characteristic of the products of the invention which are water-soluble that the reaction mixtures themselves, as well as aqueous solutions of the reaction mixture, are stable on standing in the neutral condition for much greater lengths of time than the corresponding methylolureas. Even at lowest degrees of etherification, the stability of these materials is about twice as great as that of the methylolurea compounds themselves under similar conditions.

The temperature of the reaction may be varied over wide limits. Temperatures of about 10–35°, are preferred, because under these conditions tendencies toward resinification are at a minimum. However, temperatures up to the boiling point of the reaction mixture can also be employed. Under these conditions the reaction is much more rapid, but the yields of crystalline product are generally lower. Higher temperatures are usually preferable in the case of alcohols which are inclined to enter into the reaction with some sluggishness. In any case, for successful completion of the reaction the etherification must be terminated before the reaction mixture is converted to a resin.

The ethers of the methylolureas are a well-known group of compounds, uses for which are well known. In general, the products of the process of this invention can be used for any of the purposes for which the ethers of the methylolureas have been found of interest. A specially valuable property of these reaction mixtures is, however, that the reaction mixture as a whole, although it may not be composed completely of a completely methylated ether of a methylolurea, behaves in many ways as if it were composed of the completely methylated methylolurea. For example, the methyl ether of dimethylolurea in aqueous solutions in the presence of acidic materials is quite stable, whereas dimethylolurea under the same conditions undergoes fairly rapid polymerization to insoluble or resinous materials. The products of the present reaction, either as the reaction mixture itself or after concentration, when diluted with water and acidified, behave in general as does the pure dimethyl ether of dimethylolurea. This characteristic is of special importance where the reaction mixtures are to be used for purposes for which dimethylolurea is commonly used; for example, in the crease-proofing of textiles.

In general, the non-resinous reaction mixtures of the invention are characterized by their ability when diluted to a solids concentration of 10% and acidified to a pH of 4 of not precipitating for a period of at least two times as great, when stored at 25° C., as an aqueous solution of a non-resinous methylolurea condensation product prepared using the same quantities of urea, formaldehyde and alkali at the same dilution and hydrogen ion concentration.

The reaction mixtures can also be used directly for the preparation of alcohol-modified urea-formaldehyde resins and plastic masses.

The above description and examples are intended to be illustrative only. Any modification of or variation therefrom which conforms to the spirit of the invention is intended to be included within the scope of the claims.

What is claimed is:

1. Process which comprises reacting a dimethylolurea and an aliphatic saturated unsubstituted monohydric alcohol or not more than four carbon atoms at a pH of at least 9 until an ether of a methylolurea is formed and terminating the reaction prior to resinification by removal of the ether from the alkaline menstrum.

2. Process which comprises reacting dimethylolurea and an aliphatic saturated unsubstituted monohydric alcohol of not more than four carbon atoms at a pH of at least 9 until an ether of a methylolurea is formed and terminating the reaction prior to resinification by removal of the ether from the alkaline menstrum.

3. Process which comprises reacting dimethylolurea and an alcohol of the group consisting of methyl and ethyl alcohols at a pH of at least 9 until an ether of a methylolurea is formed and terminating the reaction prior to resinification by removal of the ether from the alkaline menstrum.

4. Process which comprises reacting dimethylolurea and methyl alcohol at a pH of at least 9 until a methyl ether of a methylolurea is formed and terminating the reaction prior to resinification by removal of the ether from the alkaline menstrum.

5. Process of claim 2 wherein the menstrum is brought to the required pH by the use of sodium hydroxide.

6. Process of claim 2 wherein the alkali concentration is within the range from that required to give a pH of 9 up to 5% based on the reaction mixture as a whole.

7. Process of claim 2 wherein the dimethylolurea is present as a component of the reaction mixture obtained by reaction of urea and formaldehyde prior to the introduction of the alkali and the alcohol.

BEN EDMUND SORENSON.